United States Patent [19]

Kühnlein

[11] 4,392,094
[45] Jul. 5, 1983

[54] BRUSHLESS D-C MOTOR

[75] Inventor: Hans Kühnlein, Nuremberg-Grossgrundlach, Fed. Rep. of Germany

[73] Assignee: Siemens Aktiengesellschaft, Berlin and Munich, Fed. Rep. of Germany

[21] Appl. No.: 184,468

[22] Filed: Sep. 5, 1980

[30] Foreign Application Priority Data

Sep. 19, 1979 [DE] Fed. Rep. of Germany ....... 2937866

[51] Int. Cl.³ ............................................ H02K 29/02
[52] U.S. Cl. .................... 318/254; 318/138; 318/439
[58] Field of Search .................... 318/138, 254, 254 A

[56] References Cited

U.S. PATENT DOCUMENTS

| | | | |
|---|---|---|---|
| 3,938,014 | 2/1976 | Nakajima | 318/138 |
| 4,004,244 | 1/1977 | Schade | 330/22 |
| 4,004,247 | 1/1977 | Van de Plassche | 330/30 D |
| 4,028,598 | 6/1977 | Bergmans | 318/138 |
| 4,158,178 | 6/1979 | Schade | 330/253 |
| 4,164,918 | 8/1979 | Kinzowada | 318/254 |

FOREIGN PATENT DOCUMENTS 2363632 8/1974 Fed. Rep. of Germany .
2414336 10/1974 Fed. Rep. of Germany .

*Primary Examiner*—J. V. Truhe
*Assistant Examiner*—S. M. Bergmann
*Attorney, Agent, or Firm*—Kenyon & Kenyon

[57] ABSTRACT

A brushless D-C motor of the type having a permanent magnet rotor, a plurality of individual stator windings which are disposed 90° apart with respect to each other, and at least two Hall-effect galvanomagnetic transducers which are disposed 90° apart with respect to each other, and within the air gap of the motor. The galvanomagnetic transducers produce control signals in response to the angular position of the rotor for controlling the conductive states of semiconductive switching devices which are each electrically disposed in series with respective individual stator windings, and a controlled current generator which controls the current flowing through the stator windings so as to conform with a sinusoidal wave shape.

5 Claims, 3 Drawing Figures

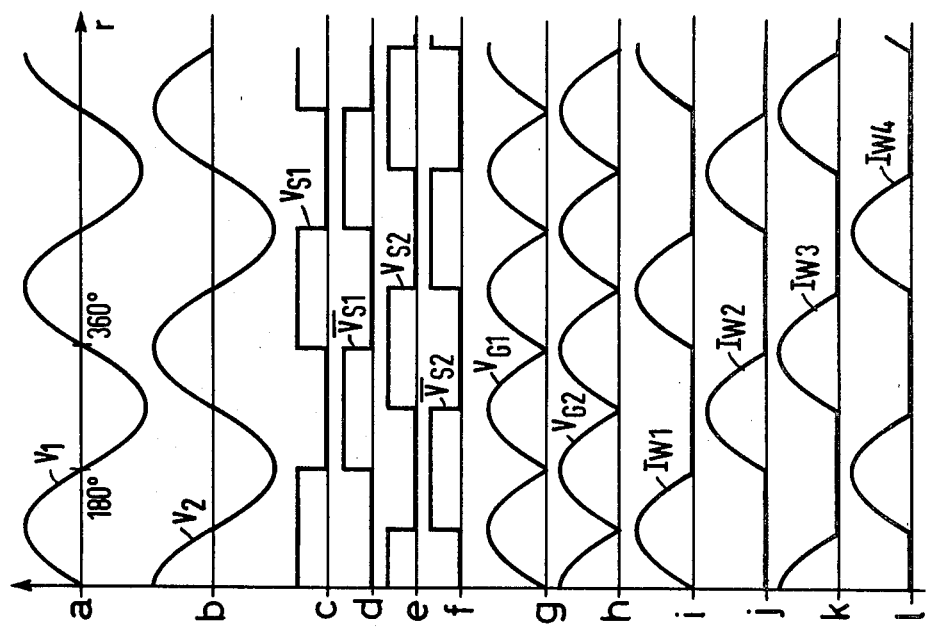
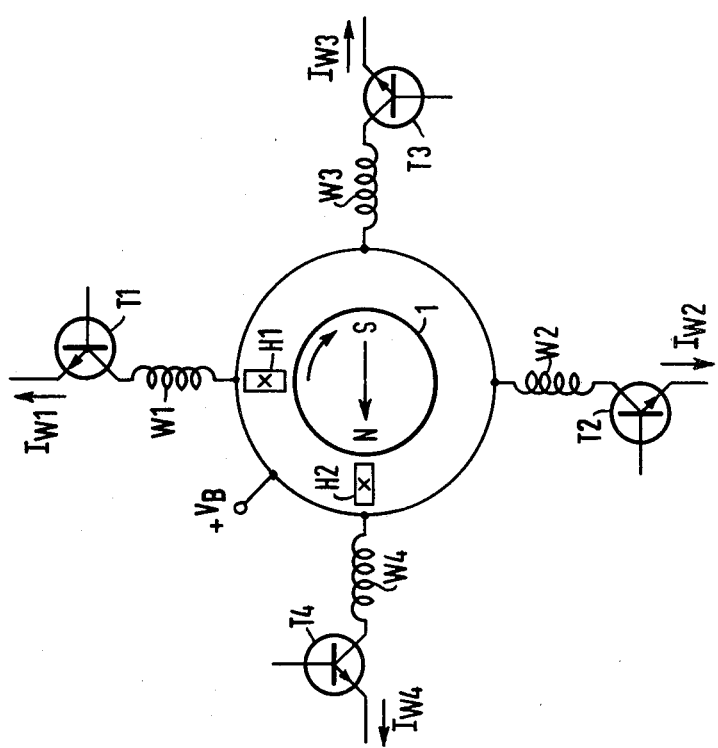
FIG 3
FIG 1

BRUSHLESS D-C MOTOR

BACKGROUND OF THE INVENTION

This invention relates generally to electric motors, and more particularly to a brushless D-C motor which is controlled by electronic switches responsive to galvanomagnetic transducers.

A known brushless D-C motor which uses a pair of Hall-effect generators as galvanomagnetic transducers to control rotation is described in "Electrical Equipment", 1972, No. 1, pp 21-23, at FIG. 1. The brushless D-C motor is described therein as a 180° circuit, having two winding legs which are disposed 90° apart. Each of the windings carries an electric current responsive to a series-connected transducer for controlling rotation of a motor rotor throughout a rotation angle range of 180°. A transistor pair which is associated with windings disposed 180° apart is controlled by control signals which are produced by one of two Hall-effect generators which are disposed 90° with respect to one another. The Hall-effect generators produce a sinusoidal output signal which corresponds to the angle of rotation of the rotor, which signals control transistors which are biased in the linear region. Thus, the currents which flow through the individual windings in response to the control by such transistors have a waveform which corresponds approximately to a sinusoidal half-wave.

In theory, the 180° circuit requires few electronic components and should have negligible torque ripple. Such small ripple results from the mathematical relationship:

$$D \sim I_{Wn} \cdot \sin^2\gamma + I_{Wn+2} \cdot \cos^2\gamma$$

In this expression, $\gamma$ represents the angle of rotor rotation; $I_{Wn}$ and $I_{Wn+2}$ represent the currents flowing through respective, spacially successive windings; and D is proportional to the torque. It can be seen from this expression that if windings currents $I_{Wn}$ and $I_{Wn+2}$ are equal, the torque is proportional to the squares of the trigonometric functions, which is equal to 1. Thus, torque is not a function of $\gamma$, thereby producing zero torque ripple. However, such zero torque ripple is not obtainable in practice because the transistors which control the current through the winding have different cutoff values and current gains, and the Hall-effect generators have different sensitivities and threshold voltages. Thus, practical applications of the known 180° circuit produce torque ripples of up to 50%.

It is, therefore, an object of this invention to provide a brushless D-C motor having reduced torque ripple.

SUMMARY OF THE INVENTION

The following object is achieved by this invention which provides a brushless D-C motor which employs electronic switching devices responsive to control signals, a pair of which switching devices controls a pair of associated windings which are disposed 180° apart. The switching devices are supplied current by a controlled current generator which provides a sinusoidal current in response to a control signal from a galvanomagnetic transducer.

In one embodiment of the invention, switching transistors function as electronic switching devices to responsively switch on and off currents through individual windings, in response to control signals from Hall-effect galvanomagnetic transducers. The winding currents are controlled by a controlled current generator, in response to the control signals from the Hall-effect generator, to conform in amplitude to a half-wave sinusoidal wave shape. Thus, this circuit is distinguishable from the known circuit described hereinabove in that the electronic switching elements do not operate linearly. The switching operation further avoids the prior art problem of non-sinusoidal winding currents which result in torque ripple as a result of variations in the cutoff thresholds of the transistors and the sensitivity of the Hall-effect generators. According to the invention, the half-wave sinusoidal shape of the winding current is predetermined and proportional to the instantaneous amplitude of the control signals from the associated galvanomagnetic transducers. Moreover, since current is conducted alternatingly through each of two windings which are disposed 180° apart, the current through two such windings can be controlled by a single shared controlled current generator. The waveform of the current flowing through the controlled current generator is controlled to conform very closely to the wave shape of a half-wave sinusoid, thereby providing a good approximation to the ideal condition in the mathematical relationship expressed hereinabove, so as to produce low torque ripple. In practical embodiments of the invention, torque ripples as low as 5% have been achieved.

In one specific illustrative embodiment of the invention, the control signals generated by the Hall-effect generators are conducted to a limit indicator having a zero threshold and complementary outputs which are inverted with respect to one another. The outputs of the limit indicators are conducted to respective switching transistors to control whether such transistors are in conductive or non-conductive states. Transfers between such states are achieved with timing precision in response to changes in the polarity of the control signals derived from the Hall-effect generators. In one embodiment, the limit indicators are rectifiers of a known type which do not have a switching threshold and can be manufactured inexpensively. The wave shape of the winding currents is controlled by a transistor which is biased to operate linearly in the controlled current generator. The base terminal of the transistor receives the control signal from the Hall-effect generator to control the amplitude of the current through the collector-emitter path. In the specific embodiment which has four electronic switching devices associated with respective windings, two controlled current generators are provided, each for controlling the wave shape of the current through a pair of diametrically disposed windings.

BRIEF DESCRIPTION OF THE DRAWINGS

Comprehension of the invention is facilitated by reading the following detailed description in conjunction with the annexed drawings in which:

FIG. 1 is a schematic representation of a brushless D-C motor;

FIG. 3 is a timing diagram showing the currents and voltages present in the brushless D-C motor, as a function of rotation angle gamma ($\gamma$).

DETAILED DESCRIPTION

Figure 2:
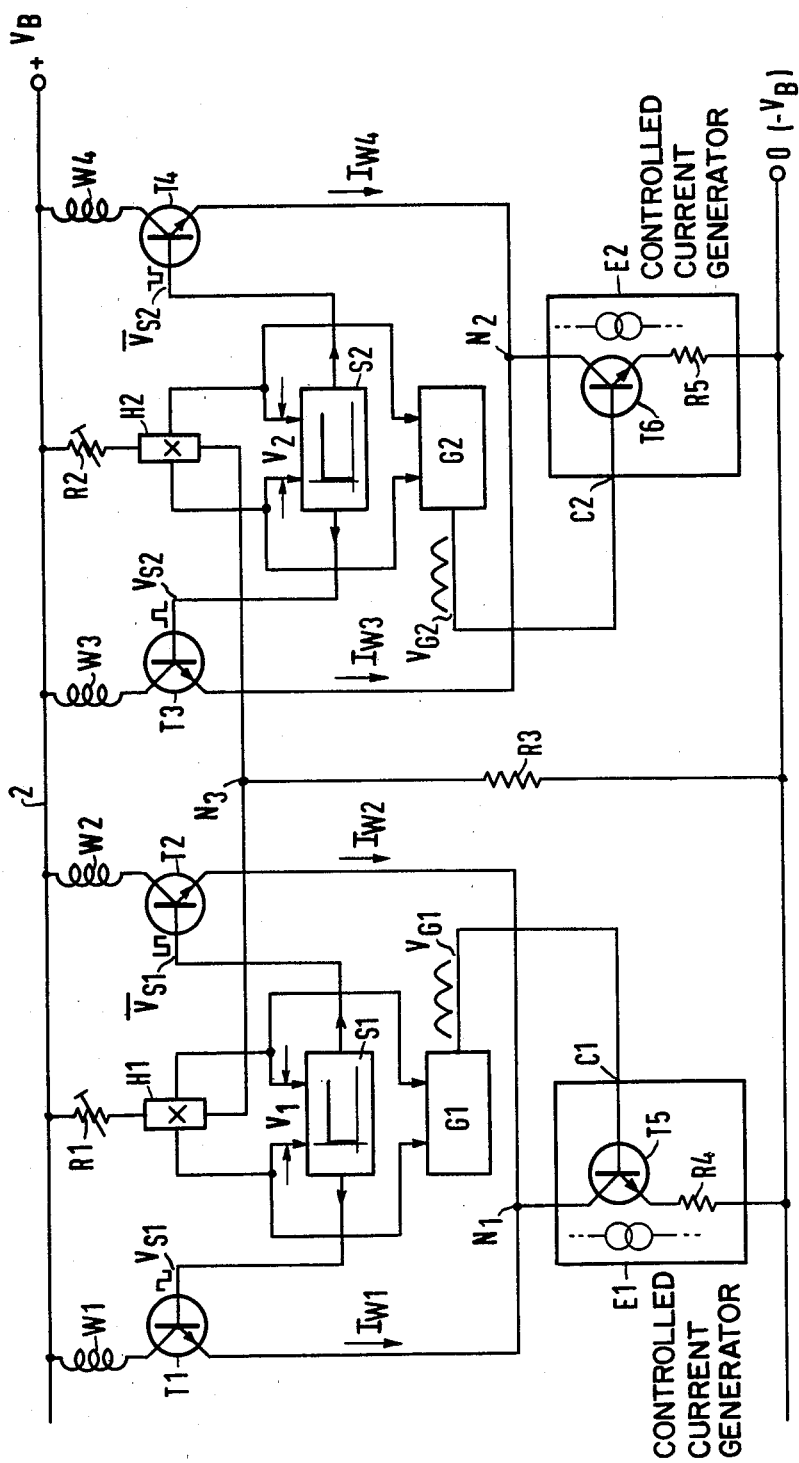
FIG. 2 is a representation, partly in schematic form and partly in block and line representation, of an embodiment of a brushless D-C motor.

FIG. 1 shows an embodiment of a brushless D-C motor having a permanently magnetized cylindrical rotor 1 which has high magnetic coercivity and induction. A plurality of stator windings, W1 to W4, are each shown connected at one end to a positive direct current voltage supply $V_B$. The windings are arranged 90° apart from another so as to be stationary in an air gap on a winding carrier (not shown). Winding W1 is disposed 180° apart from winding W2. Windings W3 and W4 are similarly diametrically disposed. In this embodiment, windings W1 and W2 form a pair of windings which represent a leg having a magnetic axis; windings W3 and W4 representing a second such leg. The winding pairs may be constructed in a known manner in the form of bifilar windings, so as to permit a high degree of symmetry. Each of the windings W1 to W4 is serially connected with a respectively associated one of electronic switching devices T1 to T4. In this embodiment, electronic switching devices T1 to T4 are NPN switching transistors which are connected to the respective windings at their collector terminals. The transistors function as electronic switches which control the flow of respective currents $I_{W1}$ to $I_{W4}$ which are supplied by controlled current generators which will be discussed hereinbelow with respect to FIG. 2.

FIG. 1 further shows two galvanomagnetic transducers H1 and H2, which are disposed near rotor 1 and produce signals which correspond to the angular position of the rotor. In this embodiment, galvanomagnetic transducers H1 and H2 are Hall-effect generators, and are disposed 90° apart from one another within the air gap of the D-C motor. Thus, Hall-effect generators H1 and H2 are permeated by the magnetic flux of rotor 1 so that their respective output signals are proportional to the product of a controlled current which is supplied by circuitry which will be discussed hereinbelow, and the rotor flux. Thus, if the amplitude of the controlled current is maintained constant, the magnitude and polarity of the signals from the Hall-effect generators correspond to the angular position of the rotor. In this embodiment, Hall-effect generator H1 is disposed axially with respect to the winding axis of winding W1, and Hall-effect generator H2 is similarly disposed with respect to winding W4.

FIG. 2 shows transistors T1 to T4 coupled at their collector terminals to a bus 2 by means of respectively associated windings W1 to W4. In some embodiments of the invention, transistors T1 to T4 can be replaced by silicon controlled rectifiers. Persons skilled in the art can devise quenching circuits to ensure that such silicon control rectifiers are extinguished at appropriate times. Bus 2 is connected to a positive supply voltage $+V_B$. The emitter terminal of the transistor pairs which are associated with diametrically disposed windings, as described hereinabove, are connected to one another. Thus, the emitters of transistors T1 and T2 are connected together at a node N1; and the emitters of transistors T3 and T4 are connected together at a node N2. A controlled current generator E1 is electrically disposed between node N1 and a reference potential $-V_B$. A second controlled current generator E2 is electrically disposed between node N2 and the reference potential $-V_B$. In some embodiments, the reference potential may be ground or zero volts. Controlled current generators E1 and E2 have respective NPN transistors T5 and T6 which are connected at their collectors to nodes N1 and N2, respectively. The emitters of transistors T5 and T6 are connected to the reference potential by means of respective resistors R4 and R5. The base terminals of the transistors are connected to respective control terminals C1 and C2, for receiving respective control signals $V_{G1}$ and $V_{G2}$. Control signals $V_{G1}$ and $V_{G2}$ are each in the form of full wave rectified sinusoids. Thus, controlled current generators E1 and E2 control the winding currents $I_{W1}$ to $I_{W4}$ to correspond in wave shape with the wave shapes of the control signals.

Hall-effect generators H1 and H2 are connected to bus 2 by means of respective variable resistors R1 and R2. The currents flowing through the Hall-effect generators are combined at a node N3 and conducted to the reference potential by means of a resistor R3. Variable resistors R1 and R2 are advantageously adjusted so that equal currents flow through the Hall-effect generators. Alternatively, such equality of controlled currents may be insured by connected the Hall-effect generators in series. The combination of constant controlled current flowing through a Hall-effect generators and the varying magnetic field resulting from rotating rotor 1 causes the Hall-effect generators to produce respective control signals $V_1$ to $V_2$. Control signals $V_1$ and $V_2$ are conducted to respective limit indicators S1 and S2, each of which provides a pair of complementary output signals which are inverted with respect to one another. Thus, limit indicator S1 provides a signal $V_{S1}$ to the base of transistor T1; and an inverted signal $\overline{V_{S1}}$ to the base terminal of transistor T2. Similarly, limit indicator S2 provides a signal $\overline{V_{S2}}$ to the base terminal of transistor T3 and an inverted signal $V_{S2}$ to the base terminal of transistor T4. Signals $V_{S1}$ and $\overline{V_{S1}}$, in addition to being inverted with respect to one another, are 90° out of phase with signal $V_{S2}$ and $\overline{V_{S2}}$, by virtue of the fact that Hall-effect generators H1 and H2 are disposed 90° apart from one another, as shown in FIG. 1. In this embodiment, limit indicators S1 and S2 function as known limiters which change the state of their complementary output signals upon every change of the polarity of the input signal. Such state changes are retained until a subsequent polarity change or zero crossing of the input signal occurs. In FIG. 2, therefore, transistor T1 is conductive while transistor T2 is non-conductive until the polarity of signal V1 changes thereby rendering transistor T1 non-conductive and transistor T2 conductive. Transistors T3 and T4 are similarly alternatingly conductive and non-conductive in response to control signal $V_2$ and limiter S2. It is apparent, therefore, that transistors T1 and T4 perform only switching functions, in contrast to the analog current control functions of the transistors in known circuits described hereinabove. The wave shapes of winding currents $I_{W1}$ to $I_{W4}$ are controlled by controlled current generators E1 and E2, and not by the switching transistors, as is the case in the prior art.

The control signals $V_1$ and $V_2$ from Hall-effect generators H1 and H2 are each conducted to an associated one of thresholdless rectifiers G1 and G2 which provide at their outputs respective signals $V_{G1}$ and $V_{G2}$. As indicated, signals $V_{G1}$ and $V_{G2}$ are conducted to respective control terminals C1 and C2 of controlled current generators E1 and E2. Since Hall-effect generators H1 and H2 are disposed within the air gap of the brushless D-C motor so as to be subject to the effects of the magnetic fields produced by the windings and the rotating rotor, the signals $V_{G1}$ and $V_{G2}$ operate within the respective controlled current generators so as to render the winding currents $I_{W1}$ to $I_{W4}$ proportional to the absolute magnitude of the sine of the angle between the magnetic flux of the rotor and the magnetic flux of the windings. Additionally, switching transistors T1 to T4 are controlled in response to the polarity of Hall-effect generator signals $V_1$ and $V_2$.

It should be noted that NPN transistors T5 and T6 in respective controlled current generators E1 an E2 may be substituted by PNP transistors. Person skilled in the art can make the required circuit modifications, such as reversing the polarity of the control signals, to render a PNP transistor embodiment operable. In addition, Hall-effect generators H1 and H2 which, in this embodiment, are connected to positive supply voltage $+V_B$ by means of resistors R1 and R2, may be provided current by a control circuit independent from that which feeds windings W1 to W4.

FIG. 3 is a timing diagram which shows the relationship of the various voltages and currents in FIGS. 1 and 2 with respect to the angle of rotation $\gamma$ of the rotor 1. Hall-effect generator signals $V_1$ and $V_2$ are plotted on lines a and b. The Figure shows that each of the Hall-effect generator signals is a sinusoid which experiences a change in polarity after every 180° of rotor rotation. It can also be seen that $V_2$ on line b leads $V_1$ on line a in phase, by 90°. This results from the fact that, for clockwise rotation of rotor 1, as shown in FIG. 1, Hall-effect generator H2 precedes Hall-effect generator H1 by 90°. Output signals $V_{S1}$, $\overline{V_{S1}}$, $V_{S2}$, and $\overline{V_{S2}}$, from limit indicators S1 and S2 are shown in lines c to f. It can be seen that signals $V_{S1}$ and $\overline{V_{S1}}$ which are associated with respective windings W1 and W2 are 180° out of phase with respect to each other. Signals $V_{S2}$ and $\overline{V_{S2}}$ are similarly 180° out of phase with respect to each other, and 90° out of phase with respect to $V_{S1}$ and $\overline{V_{S1}}$. The signals on lines c to f are shown to be pulses having fast rise and fall times, so as to insure that switching transistors T1 to T4 are switched on and off in precise synchrony with the zero crossing of the corresponding signals $V_1$ and $V_2$ from the Hall-effect generators.

As a result of the thresholdless rectification of rectifiers G1 and G2, perfect half-wave sinusoidal signals, $V_{G1}$ and $V_{G2}$ on lines g and h, are provided for controlling the controlled current rectifiers E1 and E2. Thus, the currents $I_{W1}$, $I_{W2}$, $I_{W3}$ and $I_{W4}$ are drawn through their respectively associated windings W1 to W4 during such times as respectively associated switching transistors T1 to T4 are in conductive states, by operation of Hall-effect generator signals $V_{S1}$, $\overline{V_{S1}}$, $V_{S2}$ and $\overline{V_{S2}}$; and are conducted through associated ones of controlled current generators E1 and E2 so as to have sinusoidal half-wave shapes, in accordance with preselected portions of signals $V_{G1}$ and $V_{G2}$. The resulting precise distribution in time of the current half-wave of winding currents $I_{W1}$ to $I_{W4}$, in combination with the elimination of the effects of variations in linear operating characteristics of transistors T1 to T4, produce the substantial reduction of torque ripple over the prior art. In addition, difference resulting from asymmetrical resistances in the windings W1 to W4 do not have a substantial effect on the torque wave form because the sinusoidal characteristic of the current through the windings is controlled by controlled current generators E1 and E2.

Although the inventive concept disclosed herein has been described in terms of specific embodiments and applications, other applications and embodiments will be obvious to persons skilled in the pertinent art without departing from the scope of the invention. The drawings and descriptions of specific embodiments of the invention in this disclosure are illustrative of applications of the invention and should not be construed to limit the scope thereof.

What is claimed is:

1. A brushless D-C motor of the type having a permanently magnetized rotor which has alternatingly opposite magnetic poles at its circumference; a plurality of stator windings arranged 90° apart with respect to each other; first and second galvanomagnetic transducers disposed in the motor 90° apart from each other for producing first and second control signals, respectively, the control signals being responsive to the position of the rotor; a plurality of semiconductive switching devices connected in series with associated ones of the stator windings, each for controlling a respective stator winding current, the semiconductive switching devices having conductive and nonconductive states selectable in response to the polarity of the first and second control signals; the brushless D-C motor further comprising:

first and second controlled current generator means each for controlling current flowing through selected ones of the semiconductor switching devices which are associated with stator windings which are arranged 180° with respect to each other, each of said controlled current generator means having a control input for receiving a respective one of first and second input signals, and an output for conducting an output current proportional to said respective input signal; and first and second coupling means each having an input for receiving a respective one of the control signals, and an output terminal connected to said control input of an associated one of said controlled current generator means for providing said respective input signal.

2. The D-C motor of claim 1 wherein Hall-effect generators are used as the galvanomagnetic transducers.

3. The D-C motor of claim 1 wherein there is further provided a limit indicator means connected to at least one of the galvanomagnetic transducers for receiving the respective control signal and producing first and second complementary driver signals for controlling the semiconductive switching devices.

4. The D-C motor of claim 3 wherein each of said coupling means is a thresholdless rectifier connected to one of the galvanomagnetic transducers for producing said input signal responsive to the associated control signal.

5. The D-C motor of claim 4 wherein each of said controlled current-generating means comprises a transistor having a base terminal connected to said thresholdless rectifier, and a current path for conducting the stator winding currents flowing through the pair of individual stator windings, in response to said input signal at said base terminal.

* * * * *